E. FAHSBENDER.
MASSAGE VIBRATOR.
APPLICATION FILED APR. 18, 1907.
935,746.
Patented Oct. 5, 1909.
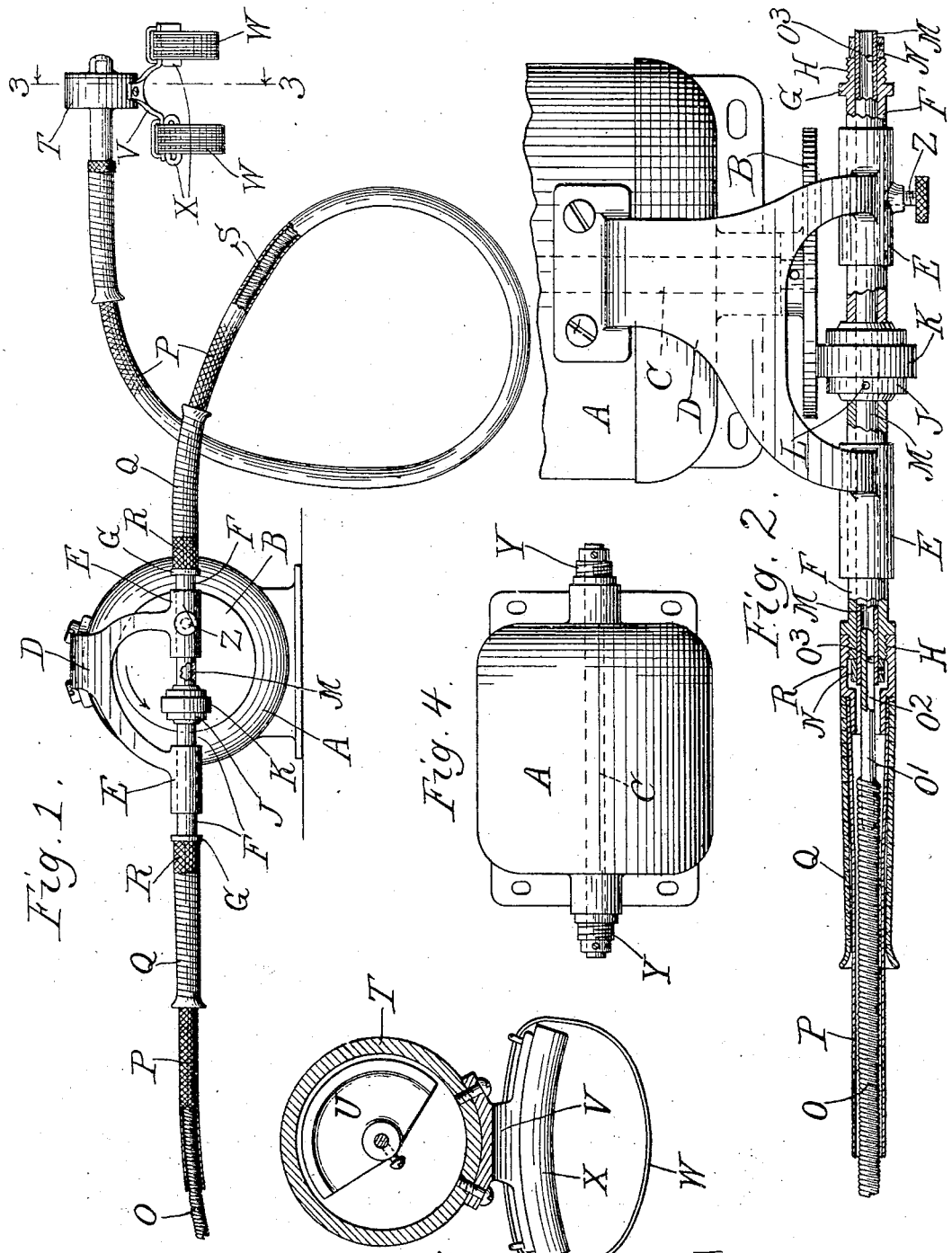
Witnesses
Edward T. Wray,
Attie E. Johnson
Inventor.
Ernest Fahsbender,
by Parker & Carter
Attorneys.

UNITED STATES PATENT OFFICE.

ERNEST FAHSBENDER, OF CHICAGO, ILLINOIS.

MASSAGE-VIBRATOR.

935,746.  Specification of Letters Patent.  Patented Oct. 5, 1909.

Application filed April 18, 1907. Serial No. 368,813.

*To all whom it may concern:*

Be it known that I, ERNEST FAHSBENDER, a citizen of the United States, residing at Chicago, in the county of Cook and State of Illinois, have invented a certain new and useful Improvement in Massage-Vibrators, of which the following is a specification.

My invention relates to massage vibrators and has for its object to provide a right and left or double vibrator operated from a single motor.

It is illustrated in the accompanying drawings, wherein—

Figure 1 is an end elevation of a motor with parts broken away; Fig. 2, a plan view of a section with parts broken away; Fig. 3, a detail on line 3—3 of Fig. 1, and Fig. 4, a plan view of a motor where the massage vibrator is applied directly to the shaft.

The drawings are to be taken as in an important sense diagrammatic.

Like parts are indicated by the same letter in all the figures.

A is the motor and B a disk on the shaft C thereof.

D is a support securely fastened to the motor frame and having downwardly depending arms each carrying a bearing E, E as shown. Inside of each of these bearings is a sleeve F having a collar G and a threaded projecting end H. The two sleeves abut the sides of a wheel J which has a central preferably elastic friction tread K bearing against the disk B. This wheel is made fast by the pin L to the shaft M which passes through the two sleeves and has a collar N at each end abutting the threaded part H of the sleeve so that the parts are held in permanent relation. A flexible shaft is adapted to be secured on each end of this driving device. The flexible shaft consists of the inner coiled wire O which has projecting the solid part $O^1$ longitudinally grooved at $O^2$ to receive the pin $O^3$ on the inside of the hollow shaft M. This coiled spring O lies inside of a shaft P, the end of which is secured between the handle part Q and the internal screw threaded securing piece R. When the parts are brought into position they are as indicated in detail, whereupon the rotation of the driving shaft M drives the flexible shaft O. The construction is the same at the other end of the device except that the spirally wound spring of the flexible shaft S is wound in the opposite direction from that of the shaft O. At the other end of each of the shafts is mounted a drum T within which is an unbalanced weight U secured to the end of the shaft O. To this drum is secured a hand piece comprising a body V, bands, to pass around the hand or fingers, W and an elastic pad X to bear against the back of the hand. In the modification shown in Fig. 4 the ends of the shafts are provided with screw threaded parts Y, Y to which the flexible shafts are attached as in the other case. In both of these cases there is a common driving shaft, a single driving unit, a uniform speed, and a joint speed varying device. In the case of the apparatus of Fig. 4 it will be whatever mechanism is employed for the varying speed of the motor. Z is a thumb-screw whereby the sleeves and shafts are locked in any desired position. The flexible shafts are wound in opposite directions to prevent unwinding or inequality of action.

The use and operation of my invention are as follows: It will be readily understood that in the case of the device of Fig. 2 speed can be regulated by shifting the sleeves and driving shaft back and forth so as to bring the wheel J to a different position along the radius of the driving disk. When the proper position has been found to give the desired speed the parts are locked in position by the thumb-screw. In massage vibrators it is highly desirable to have each hand in vibration, otherwise the treatment of the patient is unbalanced and the action of the operator is irregular. When both hands are in vibration he can apply the vibrators to opposite parts of a limb or member, getting a much better result both from the point of view of the patient and that of the operator. To get the best result from such simultaneous use of the hands it is highly desirable that the two vibrations should be at the same speed, and this preferably involves a common driving shaft and a single driving unit for the two vibrators.

I claim:

1. In a massage vibrator, the combination of a single driving unit with two flexible shafts, a common driving shaft driven by such driving unit and driving the two flexible shafts, a speed varying device comprising a disk on the driving unit and a wheel on the driving shaft, the disk and wheel co-acting so as to preserve a uniform speed for such flexible shafts, such flexible shafts comprising wire coils wound in opposite directions, and adapted for two hand vibrators one on the outer extremity of each of such shafts and a hand vibrator on at least one of said outer extremities.

2. In a massage vibrator, the combination of an electric motor having a motor shaft, with a disk on the end of such motor shaft, a support attached to the motor and having two arms which pass down in proximity to the face of the disk, two bearings one in each arm, two sleeves one in each of said bearings, a shaft which passes through both of said sleeves, a wheel on the shaft between the inner ends of the two sleeves and adapted to bear on the disk, two flexible shafts one attached to each end of such driving shaft, and adapted for two hand vibrators one on the outer extremity of each of such shafts and a hand vibrator on at least one of said outer extremities.

3. In a massage vibrator, the combination of an electric motor having a motor shaft, with a disk on the end of such motor shaft, a support attached to the motor and having two arms which pass down in proximity to the face of the disk, two bearings one in each arm, two sleeves one in each of said bearings, a shaft which passes through both of said sleeves and is provided with a stop at each end beyond said sleeves respectively, a wheel on the shaft between the inner ends of the two sleeves and adapted to bear on the disk, two flexible shafts one attached to each end of such driving shaft, and adapted for two hand vibrators one on the outer extremity of each of such shafts and a hand vibrator on at least one of said outer extremities.

ERNEST FAHSBENDER.

Witnesses:
ABBIE E. JOHNSON,
SOPHIE B. WERNER.